(12) United States Patent
Hoffmann et al.

(10) Patent No.: US 7,309,937 B2
(45) Date of Patent: Dec. 18, 2007

(54) SPINDLE MOTOR OF A SMALL-SCALE DESIGN

(75) Inventors: Joerg Hoffmann, Mettlach (DE); Olaf Winterhalter, Epfendorf (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 11/353,485

(22) Filed: Feb. 14, 2006

(65) Prior Publication Data

US 2006/0193079 A1 Aug. 31, 2006

(30) Foreign Application Priority Data

Feb. 26, 2005 (DE) .................... 10 2005 008 881

(51) Int. Cl.
*H02K 5/16* (2006.01)

(52) U.S. Cl. .................................. 310/90

(58) Field of Classification Search ........ 310/90, 310/90.5
See application file for complete search history.

(56) References Cited

U.S. PATENT DOCUMENTS

| | | | |
|---|---|---|---|
| 6,071,014 A * | 6/2000 | Lee et al. ............... | 384/107 |
| 6,456,458 B1 | 9/2002 | Ichiyama | |
| 6,483,215 B1 * | 11/2002 | Bodmer et al. ............... | 310/90 |
| 6,768,236 B2 | 7/2004 | Tokunaga | |
| 6,781,268 B2 | 8/2004 | Oku | |
| 6,836,388 B2 | 12/2004 | Nishimura | |
| 6,888,278 B2 | 5/2005 | Nishimura | |
| 7,015,611 B2 * | 3/2006 | Tokunaga et al. ............ | 310/90 |
| 2004/0091187 A1 * | 5/2004 | Aiello et al. ................ | 384/112 |
| 2004/0104634 A1 * | 6/2004 | Nishimura et al. .......... | 310/90 |

* cited by examiner

*Primary Examiner*—Dang Le
*Assistant Examiner*—Nguyen N. Hanh
(74) *Attorney, Agent, or Firm*—Cooper & Dunham LLP

(57) ABSTRACT

The spindle motor described herein comprises a rotor having a rotor hub and a shaft connected to the rotor hub, a cylindrical bearing sleeve having a central bore to accommodate the shaft and a collar disposed at the receiving aperture, a cup-shaped bearing housing closed at one end to accommodate the bearing sleeve, a baseplate to hold the bearing receiving portion, a stopper ring disposed at the inside circumference of the rotor hub between the collar and the baseplate, and at least one radial bearing region formed between the outside diameter of the shaft and the inside diameter of the bore and defined by surface patterns. According to the invention, an annular axial bearing region is provided formed between a lower face of the collar and an upper face of the stopper ring. This design and construction makes it possible to realize spindle motors having small dimensions and, in particular, low overall heights.

8 Claims, 1 Drawing Sheet

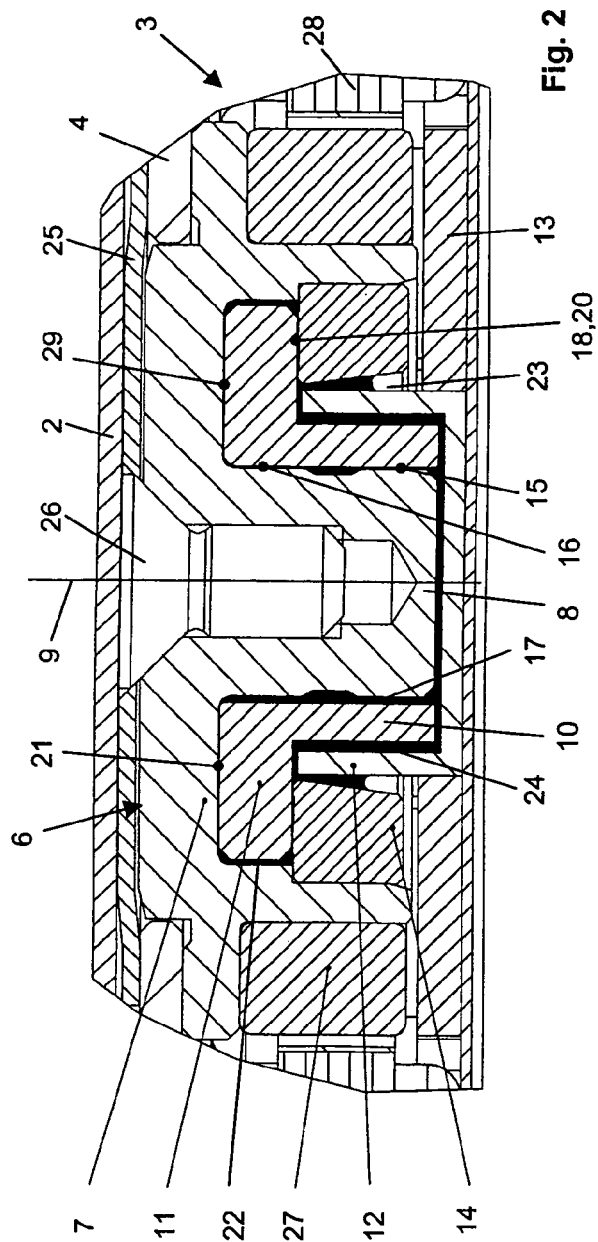
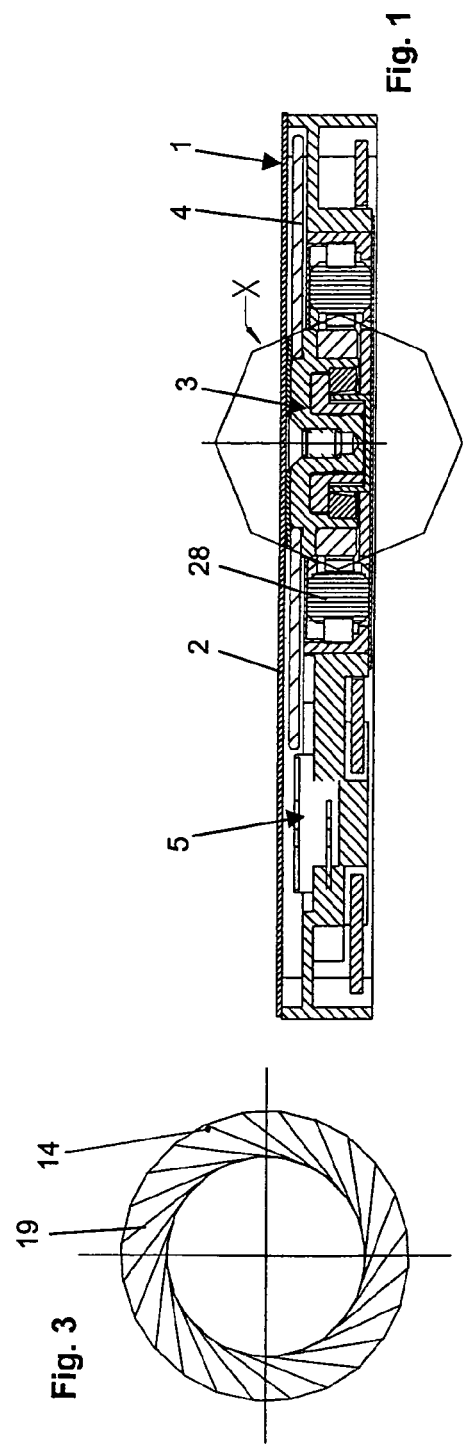
Fig. 1
Fig. 2
Fig. 3

SPINDLE MOTOR OF A SMALL-SCALE DESIGN

BACKGROUND OF THE INVENTION

The invention relates to a spindle motor of a small-scale design and a hydrodynamic bearing system according to the characteristics outlined in the preamble of claim 1. The spindle motor described herein can preferably be employed in hard disk drives, particularly in miniature hard disk drives.

PRIOR ART

Spindle motors substantially comprise a stator, a rotor and at least one bearing system disposed between these two parts. The electrically driven rotor is rotatably supported with respect to the stator with the aid of the bearing system. Hydrodynamic bearing systems, which comprise a bearing sleeve and a shaft disposed in an axial bore in the bearing sleeve, are employed in small-scale spindle motors. The shaft rotates freely within the sleeve and the two parts together form a radial bearing. The mutually interacting bearing surfaces of the shaft and the sleeve are spaced apart from one another by a thin, concentric bearing gap filled with a bearing fluid such as oil or air. A surface pattern is formed on at least one of the bearing surfaces which, due to the relative rotary movement between the sleeve and the shaft, exerts local accelerating forces on the bearing fluid located in the bearing gap. A kind of pumping action is generated in this way resulting in the formation of a homogeneous fluid film of regular thickness within the bearing gap, the fluid film being stabilized by means of hydrodynamic pressure zones. The continuous capillary fluid film and the self-centering mechanism of the hydrodynamic radial bearing ensure stable, concentric rotation between the shaft and the sleeve.

Displacement of this arrangement along the rotational axis is prevented by appropriately designed hydrodynamic axial bearings. In a hydrodynamic axial bearing, the bearing surfaces mutually interacting with each other, of which at least one is provided with a surface pattern, are each arranged on a plane perpendicular to the rotational axis and are spaced axially apart from one another by a thin, preferably even, bearing gap filled with a bearing fluid. It is known to form a hydrodynamic thrust bearing using the opposing surfaces of the end face of the bearing sleeve and the underside of the rotor hub. This results in a merely unidirectional thrust bearing in which the counterforce is preferably created by magnetic preload means.

Spindle motors having a hydrodynamic bearing system as described above have been revealed in patent documents U.S. Pat. No. 6,456,458 B1, U.S. Pat. No. 2004/0104634 A1, US 2003/0197438 A1, US 2003/0048575 A1 and US 2004/0113501 A1. The bearing systems shown here comprise an arrangement of one or more radial bearings and an axial bearing that lie in a single line, as seen along the rotational axis.

There is a trend towards the use of hard disk drives, and consequently small-scale spindle motors as well, in small portable electrical equipment such as portable music players (MP3 players) or mobile telephones, particularly in so-called smart phones. The hard disk drives employed in these kinds of applications, as well as the spindle motors to drive these disk drives, have to meet exacting requirements. The most important requirements include:

small overall size and height
high bearing system stiffness
permissible shock load of over 1000 G
easy assembly
low power consumption
low noise generation
low production costs The above criteria are very important for hard disk drives or spindle motors having a small overall size, and are not easily achieved with the well-known, conventional types of spindle motor construction.

It is thus the object of the invention to provide a spindle motor of a small-scale design that meets the above criteria.

This object has been achieved according to the invention by a spindle motor having the characteristics outlined in claim 1.

Preferred embodiments and further developments of the invention are cited in the subordinate claims.

The spindle motor described herein comprises a rotor having a rotor hub and a shaft connected to the rotor hub, a cylindrical bearing sleeve having a central bore to receive the shaft and a collar disposed at the receiving aperture, a cup-shaped bearing housing closed at one end to accommodate the bearing sleeve, a baseplate to hold the bearing receiving portion, a stopper ring disposed at the inside circumference of the rotor hub between the collar and the baseplate, and at least one radial bearing region formed between the outside diameter of the shaft and the inside diameter of the bore and defined by surface patterns. Moreover, according to the invention, an annular axial bearing region is provided between a lower face of the collar and an upper face of the stopper ring. Here, herringbone-type surface patterns may be employed in particular.

According to a preferred embodiment of the invention, the faces of the stopper ring and/or of the collar associated with the axial bearing region preferably have a non-symmetric surface pattern which, on rotation of the rotor, exerts a pumping action on the bearing fluid in the direction of the radial bearing region.

Another axial bearing region can be formed between a lower face of the rotor hub and an upper face of the collar.

The bearing gap of the hydrodynamic bearing is filled with a bearing fluid in the conventional way and extends continuously along or between the surfaces facing each other of the bearing sleeve, the collar, the shaft, the rotor hub and the stopper ring.

According to the invention, the bearing sleeve is fixedly accommodated in the bearing housing. In a preferred embodiment of the invention, at least one fluid channel is provided between the bearing housing and the bearing sleeve—or in one of these components exclusively—the fluid channel connecting the region of the bearing gap between the bearing sleeve and the shaft to the region of the bearing gap between the collar and the stopper ring. A closed circuit in which the bearing fluid can circulate is formed by the bearing gap and the fluid channel.

The bearing gap is connected to the surrounding environment by an annular gap that is connected to the bearing gap and that narrows in the direction of the bearing gap. This gap extends between the outside diameter of the bearing housing and the inside diameter of the stopper ring and is at least partially filled with bearing fluid. The gap acts equally as a reservoir for the bearing fluid as well as a capillary seal, which prevents the bearing fluid from escaping from the bearing region.

A single axial bearing is sufficient for the proper operation of the spindle motor described herein. Due to the two-way flow of bearing fluid around the collar and the unidirectional pumping action of the surface patterns on the axial bearing side, the bearing fluid circulates around the collar and keeps the arrangement in axial equilibrium. Consequently, no extra means are necessary to preload the axial bearing in one direction. Provision can be made, however, for a second annular axial bearing region to be formed between a lower face of the rotor hub and an upper face of the collar which provides the bearing with additional stabilization in an axial direction. Here, the surfaces of the rotor hub and/or of the collar associated with the second axial bearing region are also given a surface pattern. During the rotation of the rotor, the preferably non-symmetric surface pattern generates a counterforce to the first axial bearing and a pumping action on the bearing fluid in the direction of the radial bearing region.

The spindle motor according to the invention offers a range of advantages over known designs and constructions. The fact that the spindle motor is made up of components that are easy to mold and manufacture eliminates the need for costly, complex production processes.

A hydrodynamic bearing system is used that is characterized by a simple method of machining the bearing surfaces, particularly by a simple method of applying the surface patterns, since a stopper ring is used which, on the one hand, acts as a part of the axial bearing and on the other hand acts as an axial stop and which is relatively easy to machine.

The axial bearing is disposed approximately at the center in relation to the longitudinal extension of the shaft, making it possible, on the one hand, to achieve high bearing system stiffness and on the other hand to provide more freedom in the design of the spindle motor regarding its height and size.

The axial bearing is a "self-centering" bearing with a "dead" pressure zone making it unnecessary to (magnetically) preload the axial bearing. This means considerable energy saving due to the lack of magnetic preload forces.

It is possible to dimension the sealing zone and the size of the reservoir for the bearing fluid relatively freely so that the various requirements on the useful life of the bearing system can be realized.

The invention also relates to a hard disk drive that contains the spindle motor according to the invention. The hard disk drive comprises a housing in which at least one storage disk is driven in rotation by the spindle motor. Moreover, a data reading and recording device to read and write data from or onto the storage disk is provided.

An embodiment of the invention is explained in more detail below on the basis of the drawings. Further characteristics, advantages and embodiments of the invention are revealed in the drawings and the accompanying description.

BRIEF DESCRIPTION OF THE DRAWINGS

The drawings show:

FIG. 1: a schematic section through a hard disk drive having a spindle motor according to the invention;

FIG. 2: an enlarged section of the spindle motor according to the invention;

FIG. 3: a view from above of the stopper ring provided in the spindle motor.

DESCRIPTION OF A PREFERRED EMBODIMENT OF THE INVENTION

FIG. 1 shows a section through a typical hard disk drive 1 in whose housing 2 the associated components are disposed. The spindle motor 3 to drive the at least one storage disk 4 forms an essential part of the hard disk drive. Other components include the data reading and recording device 5 to read and write data from or onto the storage disk 4, the electronics (not illustrated) to control the spindle motor 3 and the data reading and recording device 5.

FIG. 2 shows an enlarged detail of the spindle motor 3 according to the invention. The spindle motor 3 substantially comprises a rotor 6, consisting of a rotor hub 7 and a shaft 8 connected to the rotor hub. In the illustrated embodiment, the shaft 8 is formed as one piece with the rotor hub 7. However, the shaft 8 could also be formed from a separate part that is fixedly connected to the rotor hub 7. The rotor 6 is made rotationally symmetric to a rotational axis 9. The shaft 8 is accommodated in a bearing sleeve 10 that has a pronounced, radially outwards extending collar 11 at its upper end facing the rotor hub 6. The bearing sleeve 10 itself is connected, for example, by means of an interference fit to a bearing housing 12 that is substantially cup-shaped and sealed in the region of the free end of the bearing sleeve 10 or shaft 8 respectively. The bearing housing 12 in turn is held in a baseplate 13 which also carries the remaining stationary parts of the spindle motor 3. A stopper ring 14 is disposed at the inside circumference of the rotor hub 7 and fills up most of the space between the collar 11 and the baseplate 13. The baseplate 13, the bearing housing 12 and the bearing sleeve 10, 11 form the stationary part of the motor, whereas the rotor 6, consisting of rotor hub 7 and shaft 8, and the stopper ring 14 form the rotating part. A hydrodynamic bearing system is used to support the spindle motor.

In the illustrated embodiment, the hydrodynamic bearing system comprises two radial bearing regions 15, 16 that are formed between the outside circumference of the shaft 8 and the inside circumference of the bearing bush 10 and that are defined by appropriate surface patterns applied in a conventional way. These surface patterns, taking the form, for example, of a herringbone pattern, generate hydrodynamic pressure in the bearing fluid found in a bearing gap formed between the shaft 8 and the bearing bush when the shaft 8 rotates.

An axial bearing region 18 is provided to stabilize the bearing system in an axial direction, the axial bearing region being formed by the faces abutting each other of the collar 11 and of the stopper ring 14, i.e. by the lower face of the collar 11 and the upper face of the stopper ring 14. When the spindle motor 3 is at a standstill, the lower face of the collar 11 rests against the upper face of the stopper ring 14. One of these faces, or both of the faces, have a surface pattern 19 that generates hydrodynamic pressure in the bearing fluid when the rotor rotates 6, and with it the stopper ring 14 as well, so that a bearing gap 20 is formed between these two faces. The surface pattern 19 can take the form, for example, of a spiral as can be seen in FIG. 3.

The upper end of section 17 of the bearing gap continues radially outwards into a section 21 of the bearing gap, since the underside of the rotor hub 7 is spaced apart to a certain extent from the topside of the collar 11. The space between sections 20 and 21 of the bearing gap is closed by section 22 which is created due to the fact that the outside diameter of the collar 11 is slightly smaller than the inside diameter of the rotor hub 7 in this region. Between the free end of the shaft 8 and the free end of the bearing sleeve 10, there is a fluid sink.

The surface patterns 19 of the stopper ring 14 are formed in such a way that they exert a radially outwards pumping action on the bearing fluid, with the result that the bearing fluid consequently circulates through sections 20, 22, 21 and 17 of the bearing gap. In order to connect section 20 of the bearing gap to section 17 of the bearing gap, at least one fluid channel 24 is provided between the bearing sleeve 10 and the bearing housing 12. The fluid channel 24 may also be disposed fully within the bearing bush 17 or within the bearing housing 12. This fluid channel 24 makes possible the complete circulation of the bearing fluid from section 17 via the fluid channel 24 to sections 20, 22, 21 and back to section 17.

The bearing gap 17 is sealed towards the surrounding environment by an annular capillary seal, which is formed by a sealing region 23 or sealing gap that narrows in the direction of the bearing gap 17. The sealing gap 23 is defined by the radially outer surface of the bearing housing 12 and the radially inner surface of the stopper ring 14 and leads into the region connecting section 20 of the bearing gap to the fluid channel 24. This sealing region 23 further acts as a reservoir for the bearing fluid as well as an expansion volume when the bearing fluid experiences changes in temperature.

Due to the continuous circulation of the bearing fluid in the bearing gap or fluid channel respectively, brought about by the pumping action of the surface patterns 19 of the axial bearing region 18, the rotor 6 can independently stabilize itself in an axial direction, making it unnecessary to provide any additional means, such as magnetic means, to generate axial preloading.

A mounting clamp 25, which is fixed by means of a screw 26, is provided to attach the storage disk 4 to the rotor 6 (FIG. 1).

The spindle motor 3 further comprises a stator arrangement 28 generating an alternating electromagnetic field that acts on a permanent magnet 27 which is mounted on the outside circumference of the rotor 6. The rotor 6 is put into rotation in the conventional way by these means. The spindle motor 3 is preferably designed as a brushless DC motor whose commutation is controlled by electronic means.

IDENTIFICATION REFERENCE LIST

1 Hard disk drive
2 Housing
3 Spindle motor
4 Storage disk
5 Data reading and recording device
6 Rotor
7 Rotor hub
8 Shaft
9 Rotational axis
10 Bearing sleeve
11 Collar
12 Bearing housing
13 Baseplate
14 Stopper ring
15 Radial bearing region
16 Radial bearing region
17 Section of the bearing gap
18 Axial bearing region
19 Surface pattern
20 Section of the bearing gap
21 Section of the bearing gap
22 Section of the bearing gap
23 Sealing region
24 Fluid channel
25 Mounting clamp
26 Screw
27 Magnet
28 Stator arrangement
29 Axial bearing region

The invention claimed is:

1. A spindle motor of a small-scale design having a hydrodynamic bearing system which comprises:

a rotor (6) having a rotor hub (7) and a shaft (8) connected to the rotor hub;

a cylindrical bearing sleeve (10) having a central bore to receive the shaft (8) and a collar (11) disposed at a receiving aperture;

a baseplate (13) to hold a bearing receiving portion;

a stopper ring (14) disposed at the inside circumference of the rotor hub (7) between the collar (11) and the baseplate (13); and at least one radial bearing region (15, 16) formed between the outside diameter of the shaft and the inside diameter of the bore and defined by surface patterns (19), characterized by a cup-shaped bearing housing (12) closed at one end to accommodate the bearing sleeve (10);

an annular axial bearing region (18) formed between a lower face of the collar (11) and an upper face of the stopper ring (14), and further characterized in that between the regions facing each other of the bearing housing (12) and the bearing sleeve (10), at least one fluid channel (24) is provided which connects a section (17) of the bearing gap between the bearing sleeve (10) and the shaft (8) to the end of a section (20), adjacent to the sealing region (23), of the bearing gap between the collar (11) and the stopper ring (14).

2. A spindle motor according to claim 1, characterized in that the faces of the stopper ring (14) and/or of the collar (11) associated with the axial bearing region (18) have a surface pattern (19) which, on rotation of the rotor (6), generates a pumping action on the bearing fluid in the direction of the radial bearing region (15,16).

3. A spindle motor according to claim 1, characterized in that a bearing gap (17, 20, 21, 22) filled with a bearing fluid is provided, the bearing gap extending continuously between the respective surfaces facing each other of the bearing sleeve (10), the collar (11), the shaft (8), the rotor hub (7) and the stopper ring (14).

4. A spindle motor according to claim 3, characterized in that a circular flow of bearing fluid is formed by the bearing gap (17, 20, 21, 22) and the fluid channel (24).

5. A spindle motor according to claim 3, characterized in that an annular gap (23) is provided between the outside diameter of the bearing housing (12) and the inside diameter of the stopper ring (14), the annular gap being connected to sections (17, 20) of the bearing gap and narrowing in the direction of the bearing gap (17, 20), and the gap being at least partially filled with bearing fluid and forming a reservoir for the bearing fluid as well as a capillary seal.

6. A spindle motor according to claim 1, characterized in that a second annular axial bearing region (29) is formed between a lower face of the rotor hub (7) and an upper face of the collar (11).

7. A spindle motor according to claim 6, characterized in that the surfaces of the rotor hub (7) and/or of the collar (11) associated with the second axial bearing region (29) have a surface pattern (19) which, on rotation of the rotor (6), generates a pumping action on the bearing fluid in the direction of radial bearing region (15, 16).

8. A hard disk drive having a spindle motor (3) according to claim 1 to drive at least one storage disk (4) in rotation.

* * * * *